(12) United States Patent
Kravitz

(10) Patent No.: US 8,878,933 B2
(45) Date of Patent: Nov. 4, 2014

(54) METHOD AND APPARATUS FOR PROVIDING AND DETERMINING INTEGRITY OF VIDEO

(75) Inventor: David W. Kravitz, Fairfax, VA (US)

(73) Assignee: Motorola Solutions, Inc., Schaumburg, IL (US)

( * ) Notice: Subject to any disclaimer, the term of this patent is extended or adjusted under 35 U.S.C. 154(b) by 601 days.

(21) Appl. No.: 12/830,520

(22) Filed: Jul. 6, 2010

(65) Prior Publication Data
US 2012/0007991 A1    Jan. 12, 2012

(51) Int. Cl.
*H04N 7/18* (2006.01)
*G07C 5/08* (2006.01)
*G08B 23/00* (2006.01)

(52) U.S. Cl.
CPC .............. *G08B 23/00* (2013.01); *H04N 7/18* (2013.01); *G07C 5/0891* (2013.01)
USPC ......................................... 348/148; 348/149

(58) Field of Classification Search
USPC ................................................ 348/148, 149
See application file for complete search history.

(56) References Cited

U.S. PATENT DOCUMENTS

| | | | |
|---|---|---|---|
| 6,282,362 B1 * | 8/2001 | Murphy et al. | 386/224 |
| 7,272,179 B2 * | 9/2007 | Siemens et al. | 375/240.01 |
| 7,508,941 B1 * | 3/2009 | O'Toole et al. | 380/228 |
| 8,190,903 B2 * | 5/2012 | Nayak et al. | 713/178 |
| 2002/0135679 A1 * | 9/2002 | Scaman | 348/148 |
| 2004/0143737 A1 * | 7/2004 | Teicher | 713/167 |
| 2004/0186740 A1 * | 9/2004 | Katsuta et al. | 705/1 |
| 2004/0250288 A1 * | 12/2004 | Palmerio | 725/105 |
| 2007/0153917 A1 * | 7/2007 | Siemens et al. | 375/240.26 |
| 2010/0146282 A1 | 6/2010 | Echizen et al. | |
| 2011/0016486 A1 * | 1/2011 | Morimoto et al. | 725/32 |
| 2011/0106571 A1 * | 5/2011 | Otake et al. | 705/4 |
| 2012/0079640 A1 * | 4/2012 | Carlston et al. | 2/2.5 |

OTHER PUBLICATIONS

Fiege, et al., "Zero Knowledge Proofs of Identity," Proceedings of the 19th Annual ACM Symposium on Theory of Computing, New York, New York, 1987, pp. 210-217.

Sinopoli, "Secure Control of Cyber Physical Systems," Cylab Partner Conference 2009, Carnegie Mellon Cylab, Pittsburgh, PA, USA, Oct. 14-Oct. 16, 2009. 32 pages.

Thanawala, "Calilfornia Police Mount Cameras on Officers' Heads, Head Cams Could Monitor Cop Behavior, Clear Cops of Wrongdoing," KGTV San Diego, San Diego News Website, Dec. 29, 2009, Downloaded from http://www.10news.com/news/22078018/detail.html on Jan. 13, 2010, 10 pages.

Kirkpatrick, et al., "Physically Restricted Authentication with Trusted Hardware," Proceedings of the 2009 ACM Workshop on Scalable Trusted Computing, Conference on Computer and Communications Security, Chicagho, Illinois, 2009, pp. 55-60.

(Continued)

*Primary Examiner* — David Lazaro
*Assistant Examiner* — Farzana Huq
(74) *Attorney, Agent, or Firm* — Barbara R. Doutre

(57) ABSTRACT

A method and apparatus for providing and determining integrity of video is provided herein. During operation, a trusted unit such as a computer housed within a securable trunk of a vehicle generates or receives data on stimuli applied to a camera and receives video purportedly taken by that camera, as means for the trusted unit or an independent entity to determine if time periods of the stimuli correspond to responses seen or heard within the video.

21 Claims, 2 Drawing Sheets

(56) References Cited

OTHER PUBLICATIONS

Taser International, "TASER-AXON Presentation," TASER International, Inc., Scottsdale, Arizona, 2010, Downloaded from http://www.taser.com/products/law/{ages/TASERAXON.aspx, 42 pages.

International Search Report and Written Opinion mailed on Mar. 15, 2011 for International Application No. PCT/US2010/062541.

* cited by examiner

100

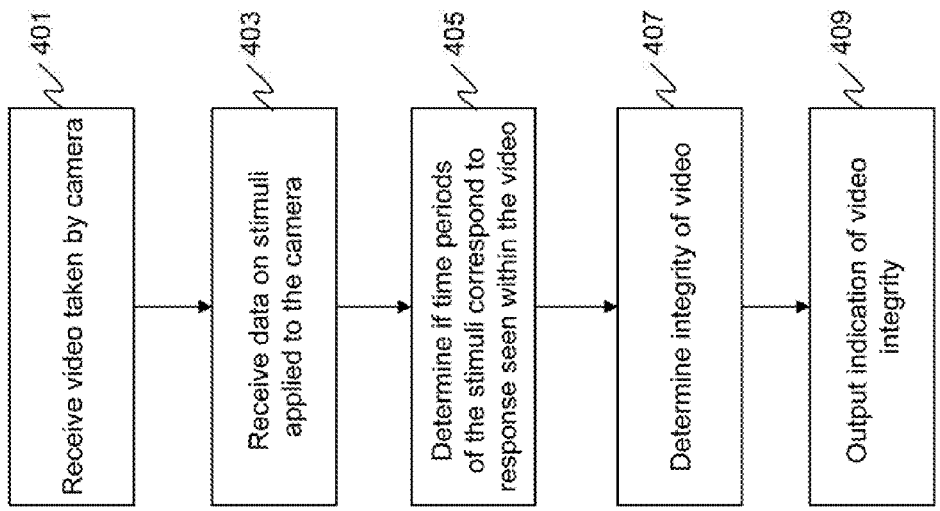
FIG. 4
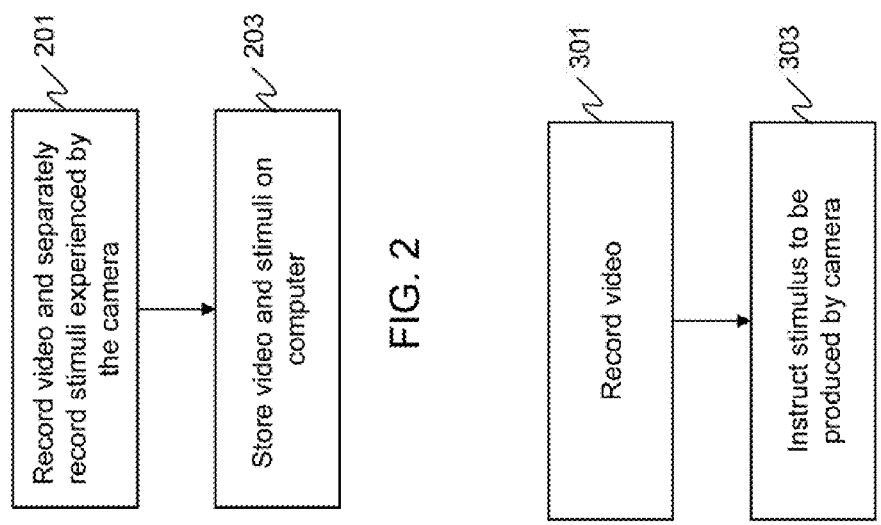
FIG. 2
FIG. 3

METHOD AND APPARATUS FOR PROVIDING AND DETERMINING INTEGRITY OF VIDEO

FIELD OF THE INVENTION

The present invention relates generally to video capture and in particular to a method and apparatus for providing and determining integrity of video.

BACKGROUND OF THE INVENTION

The use of cameras by public safety officers to record specifics of accident and crime scenes can facilitate accurate record keeping. The video can be used to objectively determine actual circumstances of critical events such as officer-involved shootings and to investigate allegations of police brutality or other crimes/criminal intent. A common use case entails an officer responding to a call by approaching the scene in their official vehicle having mounted cameras for video capture.

Whether or not the recorded "evidence" is used solely for investigative purposes (e.g., to internally clear an officer of wrongdoing or to focus a forensic investigation) or for actual court-admissible prosecution or defense, it is important to be able to determine with reasonably high assurance whether or not the video has been tainted. It is also important to be able to do this without incurring inordinate equipment and/or operations expenses that negate the benefits. Therefore, a need exists for a method and apparatus for providing and determining integrity of video.

BRIEF DESCRIPTION OF THE DRAWINGS

FIG. 2 is a flow chart showing the operation of the system of FIG. 1 when using environmental sensors.

FIG. 3 is a flow chart showing the operation of the system of FIG. 1 when the system applies stimuli to the camera.

FIG. 4 is a flow chart showing the operation of the system of FIG. 1 when determining the integrity of stored video.

Figure 1:
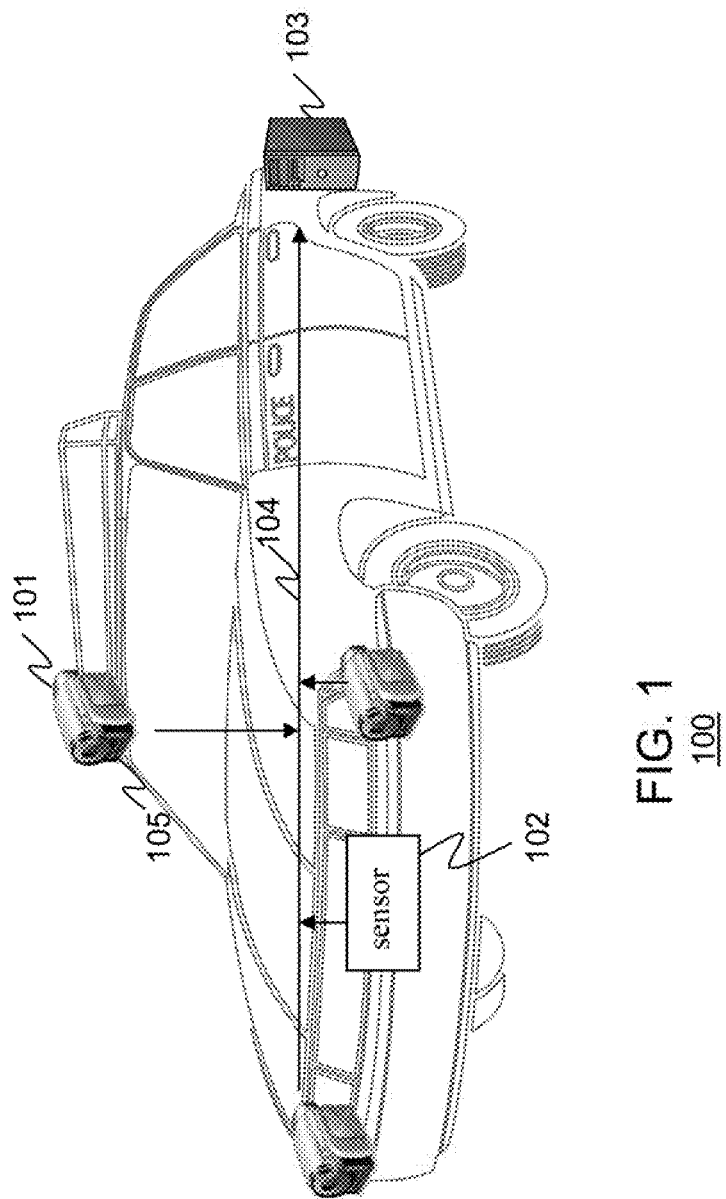
FIG. 1 illustrates a system for collection and storing of data.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE DRAWINGS

In order to alleviate the above-mentioned need, a method and apparatus for providing and determining integrity of video is provided herein. During operation a system records video via a camera and separately records or maintains a record of stimuli experienced by the camera. The integrity of the recorded video can be insured by determining if time periods of the separately recorded or otherwise reproducible stimuli correspond to a response seen within the video.

In one embodiment of the present invention, the system may be equipped with the ability to send out challenges or "markers" to the camera(s) as background light or audio capture adjustment or zoom levels, where the system tracks the times (and possibly to which camera(s)) it sent the markers so as to correlate against responses from the cameras in the form of video.

Alternatively, the system may simply track external stimuli applied to the cameras (e.g., bump, turn, position, or an acceleration of the camera). Such indirectly or externally applied stimuli may be in the form of separately recorded or reproducible challenges issued by the system to vehicle peripheral equipment such as remotely positionable camera mount(s) or a vehicle rooftop light-bar, or may be in the form of separately recorded system-external stimuli such as potholes, thunder/lightning, etc., or may be in the form of a combination thereof.

If properly implemented, the above system could eliminate the opportunity to feed pre-recorded video/audio into the camera(s) in a way that would resist detection.

Turning now to the drawings, where like numerals designate like components, FIG. 1 illustrates system 100 for collection and storing of data. As shown, system 100 comprises a plurality of cameras 101 (only one labeled). In one embodiment one or more of the cameras are mounted upon a guidable/remotely positionable camera mounting 105. In another embodiment, at least one environmental sensor 102 is provided to separately record external stimuli applied to each camera. Logic circuitry and storage unit 103 comprise a simple computer that serves to control camera mounts 105 and/or to control a vehicle rooftop light-bar and/or other vehicle peripheral equipment and to record data from sensor(s) 102 and from cameras 101. Communication between elements of system 100 is accomplished via bus(es) 104 and/or wirelessly. Although not shown, there may comprise additional wiring such as between computer 103 and camera mounts 105 in order to remotely control camera mount positioning, and/or between computer 103 and cameras 101 to transmit "markers" to one or more cameras 101. In a preferred embodiment, system 100 is mounted upon and/or partially within a police patrol automobile, but alternatively may be worn by a police officer.

As discussed, it is important to be able to determine with reasonably high assurance whether or not any video retrieved from computer 103 has been tainted at any point, i.e., not just at or subsequent to the point that the computer receives the video signal via bus 104 or wirelessly. It is also important to be able to do this without incurring inordinate equipment and/or operations expenses that negate the benefits. With this in mind, the present invention provides for the recordation of stimuli applied to cameras 101 along with video. The integrity of the recorded video can be insured by determining if time periods of the recorded stimuli correspond to a response seen within the video. It should be noted that to verify the integrity of data is to verify the data is uncompromised or unaltered and is not counterfeit. Examples of counterfeit data are data that has been pre-recorded or data that is transmitted from cameras that are situated at a location that is illegitimately distant from the vehicle.

One factor to consider when choosing the type of stimuli to record is how hard/expensive it would be for an attacker to post-process pre-recorded video/audio so as to incorporate the expected responses in a way that is indistinguishable from live embedding during capture. One reason for randomness of markers (e.g., in time and/or amplitude) is to defy guessing in advance by an adversary who wants to avoid attempts at retrofitting of pre-recorded video.

In order to ensure randomness, the system may be equipped with one or more internal sensors 102 (e.g., accelerometers) that independently track, for example, certain conditions such as hitting potholes, driving around curves, turning corners, or detecting other bumps in the road. Such jarring conditions should be evident in the output of cameras 101. If the cameras' output and the recording of sensor data do not correlate properly, this may be grounds to suspect foul play.

In one embodiment of the present invention, sensors 102 are not included in system 100. Instead, each camera mount 105 on the vehicle is assumed to be movable and positionable under the guidance of computer 103. Mount movement could be a linear motion along a single axis or multiple axes (independently or simultaneously) and/or rotary/circular motion. Such motion could trace a combination of unidirectional, reciprocating, oscillating, irregular, and intermittent paths. Movement can be accomplished through use of electric motor(s) or electromechanical actuator(s)/electromagnetic solenoid(s)/relay(s) or pneumatic/air-powered motor(s) or a hybrid of these.

The unpredictability of these randomly/pseudo-randomly generated mount movements, where the mount move instructions template is verified against captured video, is designed to detect the presence of specious video that has been significantly altered and/or captured at a different time and/or using a different mount. Also, attempted in-line removal (or addition) of video segments should result in observable discontinuities.

A user's observation of mount movement should be insufficient to enable successful replication in a timely enough fashion at a different camera mount. To make such emulation more difficult, camera mount positioning may be at variable speeds, where such speeds may be individualized per mount and may depend in part on physical adjustments made within the securable vehicle trunk and/or within the mount itself.

There are at least three different ways to perform the necessary analysis to determine whether captured video is consistent with recorded stimuli: (1) Computer 103 can perform such evaluation in real-time and can be equipped with alarm signal capability added into the recording; (2) computer 103 can cache move instructions for later evaluation by computer 103; or (3) computer 103 can cache move instructions for later independent analysis.

FIG. 2 is a flow chart showing the operation of the system of FIG. 1 when using environmental sensors 102. During operation cameras 101 record video and environmental sensors 102 separately records stimuli experienced by cameras 101 (step 201). At step 203 the video and the stimuli are stored on computer 103. Preferably, the video is time stamped as it is being recorded. Additionally, the environmental sensors 102 preferably comprise accelerometers that record events such as a bump, turn, or acceleration experienced by the camera. Preferably the computer 103 uses a secured clock to timestamp stimuli and received video, so as not to rely on timestamps associated with non-secured clocks such as within the cameras.

FIG. 3 is a flow chart showing the operation of the system of FIG. 1 when the system applies stimuli to be experienced by the camera. During operation cameras 101 record video (step 301). At step 303 computer 103 instructs a stimulus to be produced by a camera or other apparatus/device and records the time of the issued instructions. In a preferred embodiment of the present invention, the issued instructions comprise instructions for the camera mount to move in particular directions or to acquire certain positions. However, the issued instructions may comprise other instructions such as an instruction for the camera to zoom, flash, or alter its backlighting, a vehicle-peripheral light independent of the camera to flash, the vehicle's alarm or horn to sound, a noise/rumble generator within the vehicle trunk to sound, or the front or rear windshield wiper fluid to eject. Cameras may be positioned to view other cameras and the movements of their mounts. Cameras may be positioned so as to periodically ascertain the distance and orientation of those or other cameras relative to the identifiable vehicle that houses the computer 103. Counterfeiting attacks which entail video being taken by cameras illegitimately remote from that vehicle in space and/or time relative to the issued instructions can thus be successfully thwarted, whether such attacks are based on directly rerouting issued instructions to distant cameras or based on attempted replication at distant cameras of legitimately generated stimuli observable in proximity to the vehicle.

FIG. 4 is a flow chart showing the operation of the system of FIG. 1 when determining the integrity of stored video (e.g., determining the video has not been altered in any way since it was created by the camera). The logic flow begins at step 401 where a microprocessor (e.g., computer 103) receives a video taken by a camera. Computer 103 also receives data on stimuli applied to the camera (step 403). As discussed above, both the video and the stimuli data are preferably stored by computer 103. At step 405 computer 103 determines if time periods of the stimuli correspond to a response seen within the video. At step 407 computer 103 determines the integrity of the video based on whether time periods of the stimuli correspond to responses seen within the video. Finally, computer 103 outputs an indication of the integrity of the video (step 409). The output may simply be a pass/fail indication to a user, or alternatively may be a score based on how closely in time the video matches up with the stimuli data.

As discussed above, the stimuli data may comprise data that is captured external to the camera. Additionally, the camera or an external apparatus/device (e.g., camera mount) may have been instructed to produce the stimuli, or an external apparatus/device (e.g., lights) may have been instructed to produce the stimuli.

While the invention has been particularly shown and described with reference to a particular embodiment, it will be understood by those skilled in the art that various changes in form and details may be made therein without departing from the spirit and scope of the invention. For example, although the above example was given with incident data, the above technique can be utilized to verify the integrity of any type of data (audio, video, . . . , etc.). Additionally, alternatively to recording stimuli experienced by the camera, the system may be able to later reproduce such stimuli: an example of this is where the system generates camera mount positioning instructions or camera zoom instructions based on a deterministic randomizer controlled by a secretly held seed value. The seed value for such pseudo-random generation may be stored securely in the vehicle. The seed value may additionally be stored in a remote facility that is thus enabled to reproduce stimuli. Such changes may be made to the present invention without varying from the scope of the following claims:

The invention claimed is:

1. A method for determining the integrity of video, the method comprising the steps of:
   instructing an external apparatus to produce and apply stimuli to a camera while a video is being recorded by the camera, wherein the external apparatus is a light or a camera mounting;
   recording time periods during which the stimuli is applied;
   receiving the video recorded by the camera;
   receiving data on stimuli applied to the camera;
   determining if time periods during which the stimuli is applied correspond to a response seen within the video; and
   determining the integrity of the video based on whether time periods during which the stimuli is applied correspond to responses seen within the video.

2. The method of claim 1 wherein the stimuli are generated or produced externally to the camera.

3. The method of claim 1 wherein the stimuli comprises of a zoom, bump, turn, position, or an acceleration of the camera.

4. The method of claim 1 wherein the step of determining the integrity comprises the step of determining the video has not been altered in any way since it was created by the camera and that the video has not been counterfeited.

5. A method for providing integrity of video, the method comprising the steps of:
   recording video with a camera;
   instructing an external apparatus to produce and apply stimuli to the camera while the video is being recorded, wherein the external apparatus is a light or a camera mounting;
   separately recording stimuli applied to the camera and further recording the time periods during which the stimuli is applied; and
   storing both the recorded video and the recorded stimuli so that the integrity of the video can be insured by determining if time periods during which the stimuli is applied correspond to a response seen within the video.

6. The method of claim 5 wherein the step of separately recording stimuli comprises the step of recording the stimuli via an accelerometer.

7. The method of claim 5 wherein the stimuli comprises of a zoom, bump, turn, position, or an acceleration of the camera.

8. An apparatus for determining the integrity of video, the apparatus comprising:
   a computer receiving a video recorded by a camera, receiving data on stimuli applied to the camera, wherein the stimuli is created by an external device, the external device receiving instructions from the computer to produce and apply the stimuli while the video is being recorded, further wherein the external device is a light or a camera mounting, recording time periods during which the stimuli is applied, determining if time periods during which the stimuli is applied correspond to a response seen within the video, and determining the integrity of the video based on whether time periods during which the stimuli is applied correspond to responses seen within the video.

9. The apparatus of claim 8 wherein the stimuli are generated or produced externally to the camera.

10. The apparatus of claim 7 wherein the stimuli comprises of a zoom, bump, turn, position, or an acceleration of the camera.

11. The apparatus of claim 8 wherein the step of determining the integrity comprises the step of determining the video has not been altered in any way since it was created by the camera and that the video has not been counterfeited.

12. The apparatus of claim 8, wherein the computer, the external device and the camera are mounted to a vehicle.

13. The apparatus of claim 12, wherein when the external device comprises a light, the light comprises a roof-top light bar of the vehicle, the roof-top light bar receiving the instructions from the computer.

14. The apparatus of claim 12, wherein when the external device comprises a camera mount, the camera mount receives the instructions from the computer.

15. The apparatus of claim 14, further comprising a plurality of cameras each mounted to the vehicle via a camera mount, the plurality of cameras positioned to view other cameras and the movements of their respective camera mounts.

16. The method of claim 5, wherein the instructions are sent by a computer mounted to a vehicle, and the external apparatus and camera are also mounted to the vehicle.

17. The apparatus of claim 16, wherein when the external device comprises a light, the light comprises a rooftop light-bar mounted to the vehicle, the roof-top light bar receiving the instructions from the computer to apply the stimuli to the camera; and wherein when the external device comprises a camera mount, the camera mount receiving the instructions from the computer to apply the stimuli to the camera.

18. The method of claim 1, wherein the external apparatus and camera are mounted to a vehicle, and instructing further comprises sending instructions by a computer, also mounted to the vehicle, to the external apparatus.

19. The method of claim 18, wherein when the external apparatus comprises a light, the light comprises a rooftop light-bar mounted to the vehicle, and roof-top light bar receiving instructions from the computer to apply stimuli to the camera.

20. The method of claim 18, wherein when the external apparatus comprises a camera mounting, the camera mounting is mounted to the vehicle and receives instructions from the computer to apply stimuli to the camera.

21. The method of claim 20, wherein the instructions comprise instructions for the camera mounting to move in particular directions or to acquire certain positions.

* * * * *

UNITED STATES PATENT AND TRADEMARK OFFICE
CERTIFICATE OF CORRECTION

PATENT NO.        : 8,878,933 B2                                        Page 1 of 1
APPLICATION NO.   : 12/830520
DATED             : November 4, 2014
INVENTOR(S)       : David W. Kravitz It is certified that error appears in the above-identified patent and that said Letters Patent is hereby corrected as shown below:

IN THE CLAIMS:

In Column 6, Line 9, in Claim 10, delete "claim 7" and insert -- claim 8 --, therefor.

Signed and Sealed this
Tenth Day of May, 2016

Michelle K. Lee
*Director of the United States Patent and Trademark Office*